United States Patent
Suzuki

(10) Patent No.: US 8,208,614 B2
(45) Date of Patent: Jun. 26, 2012

(54) RELIABILITY AUTHORIZING METHOD, RELIABILITY AUTHORIZING DEVICE, AND RELIABILITY AUTHORIZING SYSTEM

(75) Inventor: Hirobumi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 966 days.

(21) Appl. No.: 11/494,778

(22) Filed: Jul. 27, 2006

(65) Prior Publication Data

US 2007/0220146 A1 Sep. 20, 2007

(30) Foreign Application Priority Data

Mar. 14, 2006 (JP) ................................. 2006-069686

(51) Int. Cl.
*H04M 15/06* (2006.01)
(52) U.S. Cl. ............. 379/142.15; 379/112.01; 379/284; 379/344; 709/225; 709/226; 709/227; 709/228; 709/229
(58) Field of Classification Search .................. 713/176, 713/188, 201, 153, 168; 709/200, 226, 225; 370/332
See application file for complete search history.

(56) References Cited

U.S. PATENT DOCUMENTS

| | | | | |
|---|---|---|---|---|
| 6,631,122 B1 * | 10/2003 | Arunachalam et al. | ....... | 370/332 |
| 7,512,808 B2 * | 3/2009 | Liang | ............................ | 713/188 |
| 7,653,811 B2 * | 1/2010 | Yagiura | .......................... | 713/166 |
| 2003/0014626 A1 * | 1/2003 | Poeluev et al. | ............... | 713/153 |
| 2003/0074582 A1 * | 4/2003 | Patel et al. | ..................... | 713/201 |
| 2003/0177391 A1 * | 9/2003 | Ofek et al. | ..................... | 713/201 |
| 2003/0191695 A1 | 10/2003 | Kondo et al. | | |
| 2005/0114429 A1 * | 5/2005 | Caccavale | ...................... | 709/200 |
| 2006/0075231 A1 * | 4/2006 | Yu et al. | ........................ | 713/168 |
| 2007/0058807 A1 * | 3/2007 | Marsh | ............................. | 380/44 |

FOREIGN PATENT DOCUMENTS

| | | |
|---|---|---|
| JP | 2001-52068 | 2/2001 |
| JP | 2001052068 | 2/2001 |
| JP | 2002-300191 | 10/2002 |
| JP | 2002-324195 | 11/2002 |
| JP | 2003-99652 | 4/2003 |
| JP | 2003-216582 | 7/2003 |
| JP | 2004-5334 | 1/2004 |
| JP | 2005322964 | 11/2005 |
| WO | 02/099695 | 12/2002 |

OTHER PUBLICATIONS

Notice of Rejection dated Jul. 12, 2011, from corresponding Japanese Application No. 2006-069686.
Decision of Rejection dated Mar. 13, 2012 from the corresponding Japanese Application No. 2006-069686, with English translation.

* cited by examiner

*Primary Examiner* — Curtis Kuntz
(74) *Attorney, Agent, or Firm* — Katten Muchin Rosenman LLP

(57) ABSTRACT

A reliability authorizing device determines whether to authorize a service transfer based on reliability of a partner device or a partner user when one user of one device authenticates other user of other device to exchange the service between devices connected to a network. A partner-reliability collecting unit collects reliability of the partner device or the partner user. A partner-reliability providing unit provides the reliability of the partner device or the partner user collected by the partner-reliability collecting unit.

15 Claims, 9 Drawing Sheets

FIG.5

| RECORDING DATE/TIME | USER ID | OS DATA | FIREWALL | COMMUNICATION METHOD | ACCESS CONCEN-TRATION | AGE | AVAILABLE TIME LIMIT | AVAILABLE TIME | AVAILABLE AMOUNT | CREDI-BILITY |
|---|---|---|---|---|---|---|---|---|---|---|
| 2006/2/15 16:20:15 | 025 | SERVER OSver3.0 | FIREWALL PRESENT | http | PRESENT | 20 YEARS AND ABOVE | UNLIMITED | 00:00:00 TO 23:59:59 | 10 | B |
| 2006/2/15 17:44:52 | 068 | SERVER OSver3.2 | FIREWALL PRESENT | https | ABSENT | 18 YEARS AND ABOVE | UNLIMITED | 00:00:00 TO 23:59:59 | 70 | A |
| 2006/2/15 17:51:21 | 003 | SERVER OSver3.0 | FIREWALL ABSENT | https | ABSENT | 0 YEARS AND ABOVE | TILL 3 HOURS | 04:00:00 TO 23:59:59 | 50 | C |
| ... | ... | ... | ... | ... | ... | ... | ... | ... | ... | ... |

FIG.6

| RECORDING DATE/TIME | USER ID | CONNECTION PARTNER USER ID | ACCESS START DATE/TIME | ACCESS END DATE/TIME | ACCESS TIME |
|---|---|---|---|---|---|
| 2006/2/15 15:57:33 | 218 | 021 | 2006/2/15 15:57:33 | 2006/2/15 16:57:33 | 1:00:00 |
| 2006/2/15 16:20:15 | 025 | 284 | 2006/2/15 16:20:15 | 2006/2/15 16:41:20 | 0:21:05 |
| 2006/2/15 17:44:52 | 068 | 587 | 2006/2/15 17:44:52 | 2006/2/15 17:58:05 | 0:13:13 |
| ... | ... | ... | ... | ... | ... |

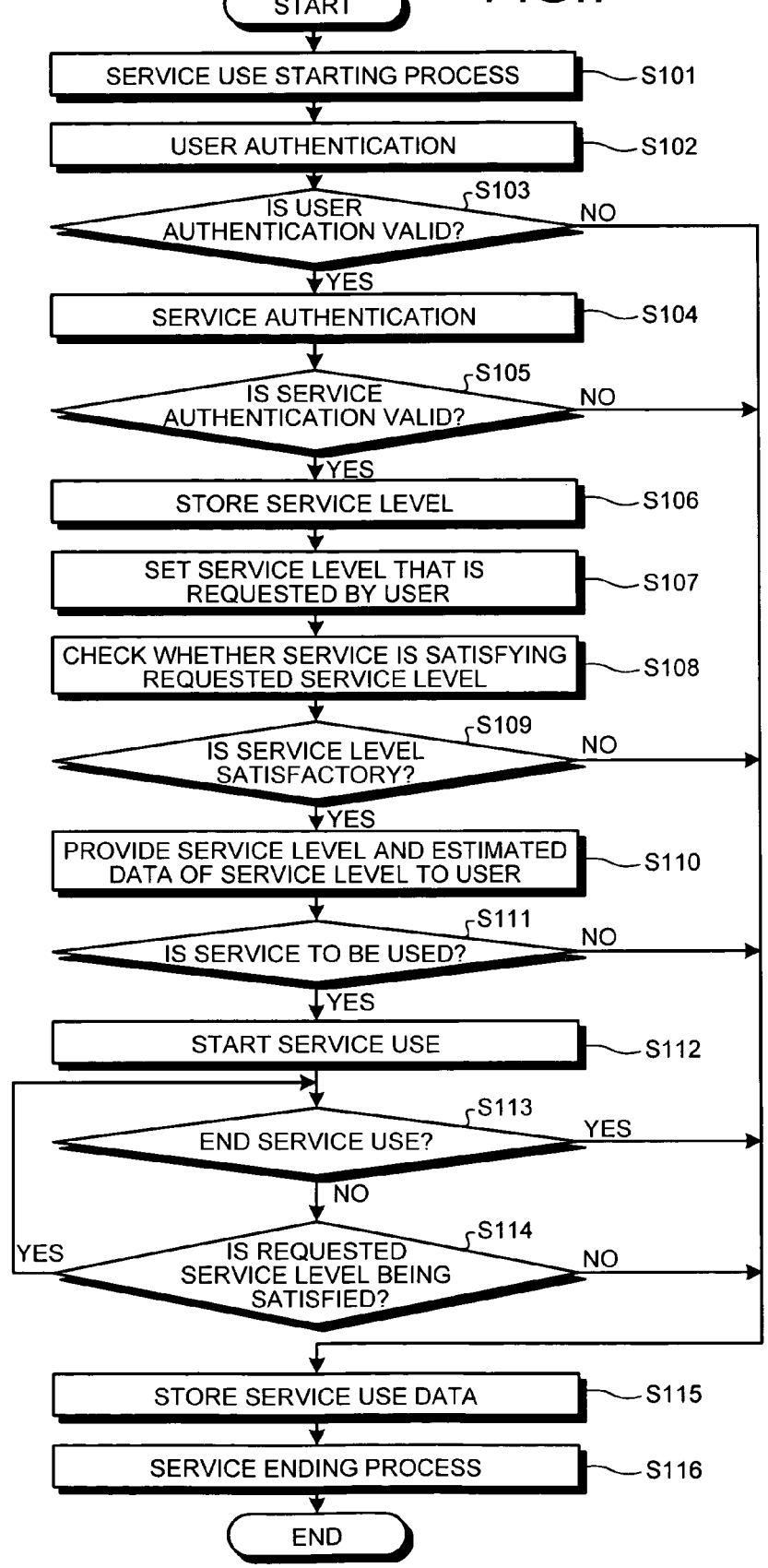

FIG.8

| RECORDING DATE/TIME | USER ID | DEVICE TYPE | OS DATA | APPLICATION DATA | VIRUS INSPECTION DATA | WIRING TYPE | PEER-TO-PEER PROGRAM | ACCESS CONCENTRATION | AGE | AVAILABLE AMOUNT | PAYMENT DELAY | CREDIBILITY |
|---|---|---|---|---|---|---|---|---|---|---|---|---|
| 2006/2/15 16:25:20 | 218 | PC | PCOS ver1.0 | ver2.0 | VIRUS CHECK ABSENT | ADSL | PRESENT | PRESENT | TWENTIES | 50 | NO DELAY | B |
| 2006/2/15 16:45:57 | 523 | MOBILE PHONE | MOBILE OS v2.11 | ver3.0 | VIRUS CHECK PRESENT | WIRELESS COMMUNICATION | ABSENT | ABSENT | THIRTIES | 100 | NO DELAY | A |
| 2006/2/15 17:15:05 | 550 | PDA | PDAOS ver3.56 | Ver2.5 | VIRUS CHECK PRESENT | WIRELESS COMMUNICATION | ABSENT | ABSENT | THIRTIES | 150 | NO DELAY | A |
| 2006/2/15 17:38:10 | 298 | PC | PCOS ver1.1 | Ver2.5 | VIRUS CHECK PRESENT | FTTH | ABSENT | ABSENT | THIRTIES | 10 | DELAY | C |
| ... | ... | ... | ... | ... | ... | ... | ... | ... | ... | ... | ... | ... |

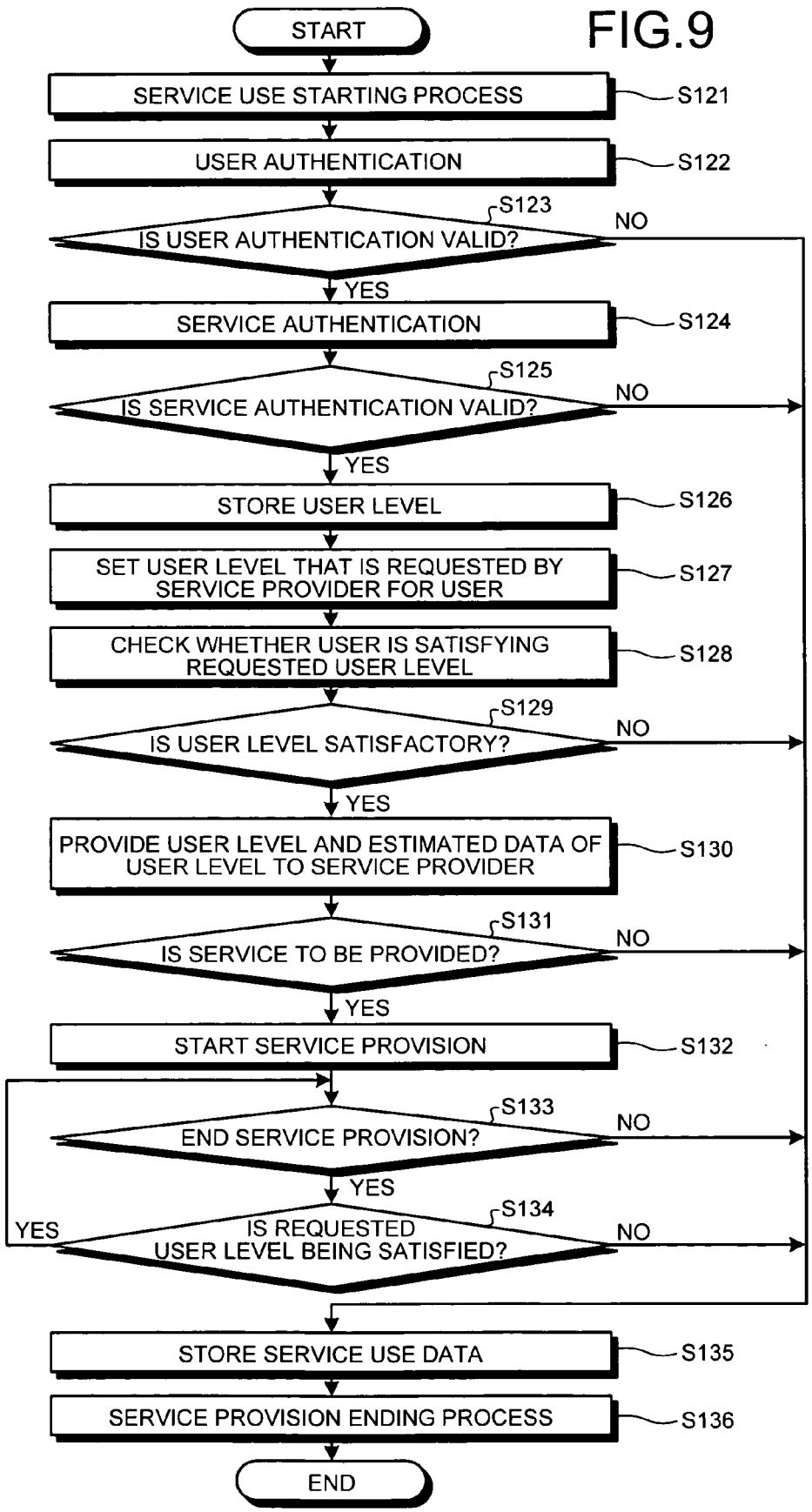

RELIABILITY AUTHORIZING METHOD, RELIABILITY AUTHORIZING DEVICE, AND RELIABILITY AUTHORIZING SYSTEM

BACKGROUND OF THE INVENTION

1. Field of the Invention

The present invention relates to a technology for determining whether to authorize a service transfer based on reliability of a partner device or a partner user when a user of one device authenticates a user of other device to exchange the service between devices connected to a network.

2. Description of the Related Art

Conventionally, for using a service provided on the Internet, generally a user logs on to the service by using a combination of a user identification (ID) and a password etc. In other words, for logging on to the service and receiving the provided service, the user must undergo user authentication by an authenticating system that is mounted on a server that provides the service. The user can use the service only after the user is authenticated as an authorized user via the user authentication.

Generally, the service is provided after confirming the safety of service use authority and a communication path that are possessed by the user who is authenticated by the authentication system. Thus, a service provider selects the user via an authentication process that confirms authenticity of the user and an authorization process that confirms safety of the use authority and the communication path of the user, and provides the appropriate data to the selected user.

For example, in a service selecting and providing method disclosed in Japanese Patent Application Laid-Open No 2002-300191, a service is selected and provided according to terminal attributes of the user in response to a service provision request from the user to a service providing device. If the service provision request is a request for fetching an electronic mail and the terminal includes a communication line having a communication speed with high terminal attributes, a service is selected and provided that causes the terminal to fetch an electronic mail that includes an attached file having a large file size. If the terminal includes a communication line having a communication speed with low terminal attributes, a service is selected and provided that causes the terminal to fetch an electronic mail that does not include an attached file having a large file size.

In a service providing system disclosed in Japanese Patent Application Laid-Open No 2003-216582, based on a security level according to a relation between user attributes and provided services, a service from a plurality of services is selectively provided to the user. Further, the aforementioned service providing system enables to carry out update of the security level according to system operation status, thereby enabling to enhance both operability and security.

However, in the conventional technology represented in Japanese Patent Laid-Open Publication No 2002-300191 and Japanese Patent Laid-Open Publication No 2003-216582, because only the service provider unilaterally determines the user's attributes and selects the service that is provided, the user does not have any option. In other words, in the authorization process, the user does not have an option that enables the user to safely receive the provided service after learning attributes related to reliability such as safety of the service provider, communication performance etc.

In general, the service provider also prefers to provide a service while excluding a potentially intimidating user. However, in the conventional technology represented in Japanese Patent Laid-Open Publication No 2002-300191 and Japanese Patent Laid-Open Publication No 2003-216582, the authorizing process does not explicitly provide a criterion that would enable the service provider to identify a potentially intimidating user, and the service provider has to provide the service assuming that the user is trustworthy.

Because the conventional technology is based on the assumption that the user is trustworthy to some extent only via the authentication process, the authorization process does not enable the service provider to select the user, and conversely, does not enable the user to select the service. For this reason, recently provision and use of various services on the Internet is also accompanied by a steep rise in fraudulent acts such as impersonation and unauthorized access.

SUMMARY OF THE INVENTION

It is an object of the present invention to at least partially solve the problems in the conventional technology.

A reliability authorizing method according to one aspect of the present invention is for determining whether to authorize a service transfer based on reliability of a partner device or a partner user when one user of one device authenticates other user of other device to exchange the service between devices connected to a network. The reliability authorizing method includes collecting reliability of the partner device or the partner user; and providing the reliability of the partner device or the partner user collected at the collecting.

A reliability authorizing device according to another aspect of the present invention determines whether to authorize a service transfer based on reliability of a partner device or a partner user when one user of one device authenticates other user of other device to exchange the service between devices connected to a network. The reliability authorizing device includes a partner-reliability collecting unit that collects reliability of the partner device or the partner user; and a partner-reliability providing unit that provides the reliability of the partner device or the partner user collected by the partner-reliability collecting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table image of a service-level-data table according to a first embodiment of the present invention;

FIG. 6 is a table image of a service-use-data table according to the first embodiment;

FIG. 7 is a flowchart of a sequence of a service-level confirming process according to the first embodiment;

FIG. 8 is a table image of a user-level-data table according to a second embodiment of the present invention; and FIG. 9 is a flowchart of the sequence of a service-level confirming process according to the second embodiment.

DETAILED DESCRIPTION OF THE PREFERRED EMBODIMENTS

Exemplary embodiments of the present invention are explained in detail below with reference to the accompanying drawings.

In an example shown in a first embodiment of the present invention, service use is authorized based on whether reliability of a service provider and a service providing device satisfies reliability that is requested by a service user. In other words, according to the first embodiment, the service user possesses discretion of service use authorization.

Figure 1:
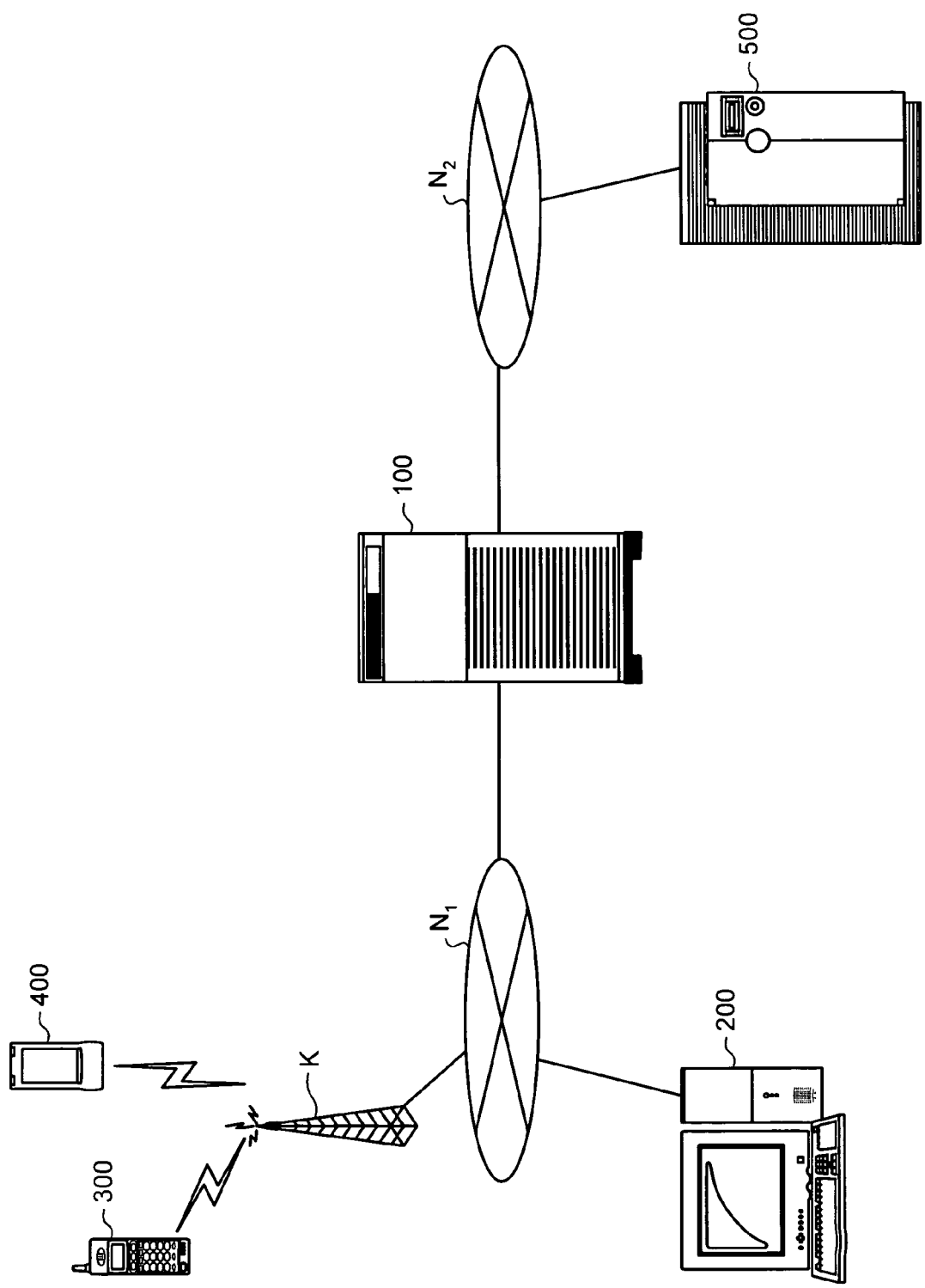
FIG. 1 is a schematic of a network structure according to the present invention.

FIG. 1 is a schematic of a network structure related to the reliability authorizing method, the reliability authorizing device, and the reliability authorizing system according to the present invention. As shown in FIG. 1, the Internet service system according to the present invention includes a service use terminal 200 connected to a network $N_1$, a mobile phone terminal 300 and a Personal Digital Assistant (PDA) 400 that perform a role equivalent to the role of the service use terminal 200 and are connected to enable wireless communication via a base station K, a service providing device 500 that is connected to a network $N_2$, and a service mediating device 100 that is positioned between the network $N_1$ and the network $N_2$.

In the Internet service system shown in FIG. 1, the service providing device 500 provides a service in response to a service provision request from the service use terminal 200, the mobile phone terminal 300, and the PDA 400. The service mediating device 100 intermediates between the service provision request and the service provision, and carries out service use authorization based on service provision conditions.

In a conventional access control technology in internet services such as online shopping, Internet banking, online stock transaction, net auction, distribution of images and music, Internet polling etc., a terminal authentication technology or a server authentication technology that use a password and an identification (ID) card etc. are commonly used. Based on the terminal authentication technology and the server authentication technology, the service user selects a service that he or she intends to use and uses the selected service under circumstances that assume that safety is secured to some extent between the service user and the service provider. Desirably, the service user and the service provider should first confirm by authentication whether the partner is authentic and select the partner after determining by authorization whether the partner is an appropriate online partner. However, currently, the partner is authorized if an authentication result is accurate.

Regardless of whether the person is the service provider or the service user, a person connected to an Internet service does not disclose to the partner, data of one's own reliability that includes safety (device performance, communication performance, update of Operating System (OS) and application programs, whether a virus inspection program is in operation, update of virus definition file, whether exposed to a Denial-of-Service (DoS) attack etc.) and credibility (creditworthiness related to payment, occurrence of payment delay, frequency of use, use expenses etc.). Thus, the service user cannot use the service safely with the knowledge that reliability of the service provider is secured. Conversely, the service provider also cannot provide the service safely with the knowledge that reliability of the service user is secured. Thus, currently, a service is provided or used while trusting the partner without learning whether the partner carrying out exchange of the service is sufficiently reliable.

According to the present invention, the service mediating device intermediates between a service user terminal and the service providing device, thereby enabling the service provider to explicitly indicate his or her reliability to the service user and enable service selection based on reliability. Further, the service user can explicitly indicate reliability that is requested by the service provider, and an unauthorized user is excluded beforehand. To be specific, the service user explicitly indicates his or her reliability to the service provider, thereby enabling selection of a service user based on reliability. Further, the service user explicitly indicates reliability that is requested from the service provider, thereby enabling the service user to select and use quality services.

Thus, according to a salient feature of the present invention, both the service user and the service provider explicitly indicate their own reliability to each other, thereby enabling both the service user and the service provider to safely provide and use the service. Further, accumulating each other's reliability thus indicated explicitly enables both the service provider and the service user to select each other based on future reliability that is estimated from the past reliability. The service mediating device essentially treats both the service provider and the service user as the same service connection users.

Figure 2:
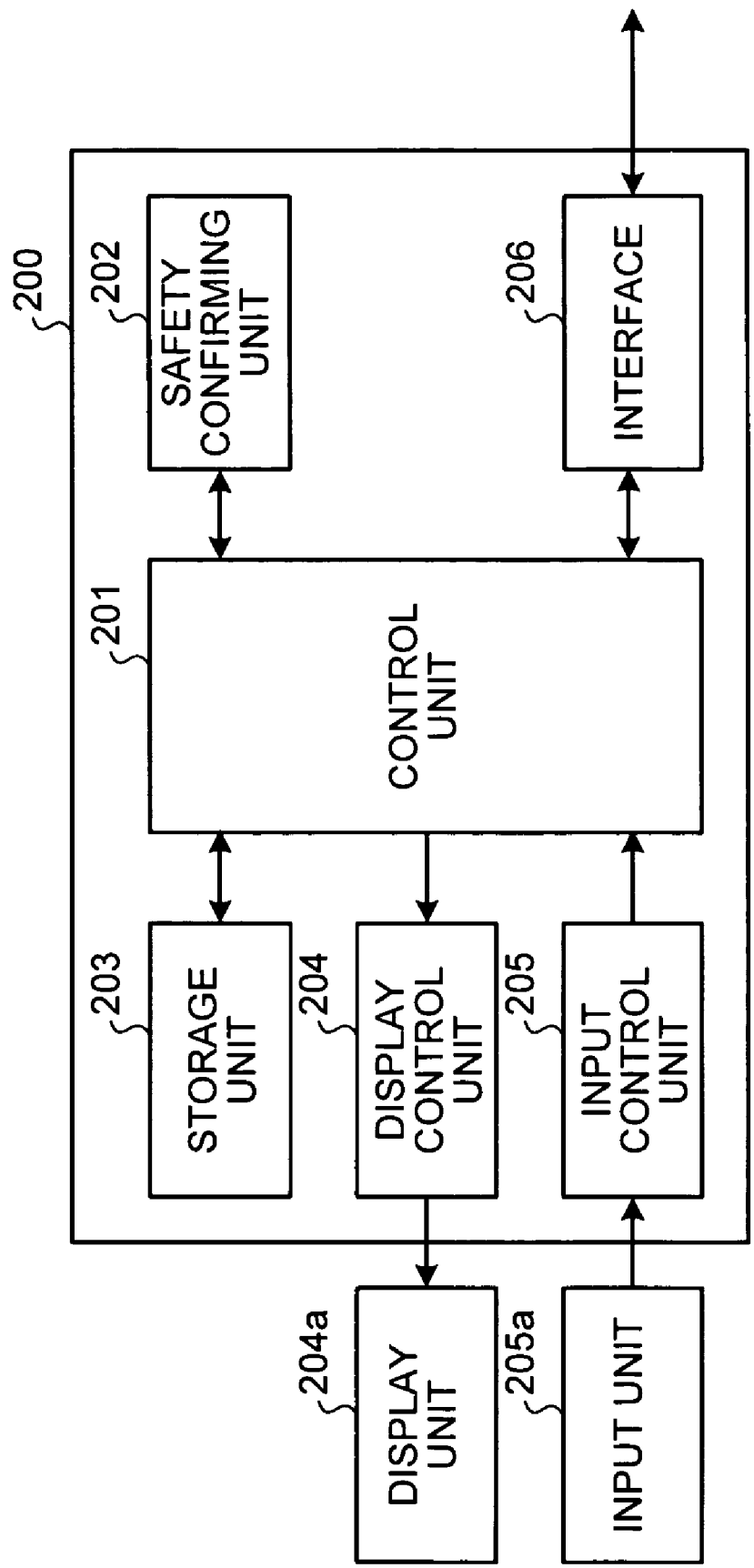
FIG. 2 is a functional block diagram of a structure of a service use terminal shown in FIG. 1.

FIG. 2 is a functional block diagram of the structure of the service use terminal 200 shown in FIG. 1. As shown in FIG. 2, the service use terminal 200 includes a control unit 201 that controls the service use terminal 200 as a whole, a safety confirming unit 202, a storage unit 203 consisting of a volatile temporary storage unit that is a program work area and a non volatile magnetic disk device or a magneto optical disk device that is a program storage area, a display control unit 204 that controls display in a display unit 204a that is a display device, an input control unit 205 that receives an input operation from an input unit 205a such as a keyboard or a mouse, and an interface 206 for carrying out transfer of data with an external device by connecting the service use terminal 200 with the network.

The safety confirming unit 202 receives data of reliability of the service providing device 500 that is transmitted from the service providing device 500 via the service mediating device 100, and carries out a process causing the display control unit 204 of the service use terminal 200 to display the received data in the display unit 204a. Based on the data of reliability of the service providing device 500, the service user can determine whether to select the service when using a service.

The safety confirming unit 202 carries out a process to notify to the service mediating device 100, data of reliability that is requested for a service by the service user who intends to use the service and that is input from the input unit 205a via a Graphical User Interface (GUI) etc. that is displayed in the display unit 204a of the service use terminal 200. The data of reliability that is requested for the service serves as selecting conditions for the service user to select and use the service. The data of reliability includes not only physical safety data of the service providing device 500 itself such as data of safety and security level due to a communication method, but also data such as credibility of the service provider who provides the service by using the service providing device 500, limit of service provision enabling amount etc. The data of reliability enables the service user to use only the service that satisfies desired reliability.

Figure 3:
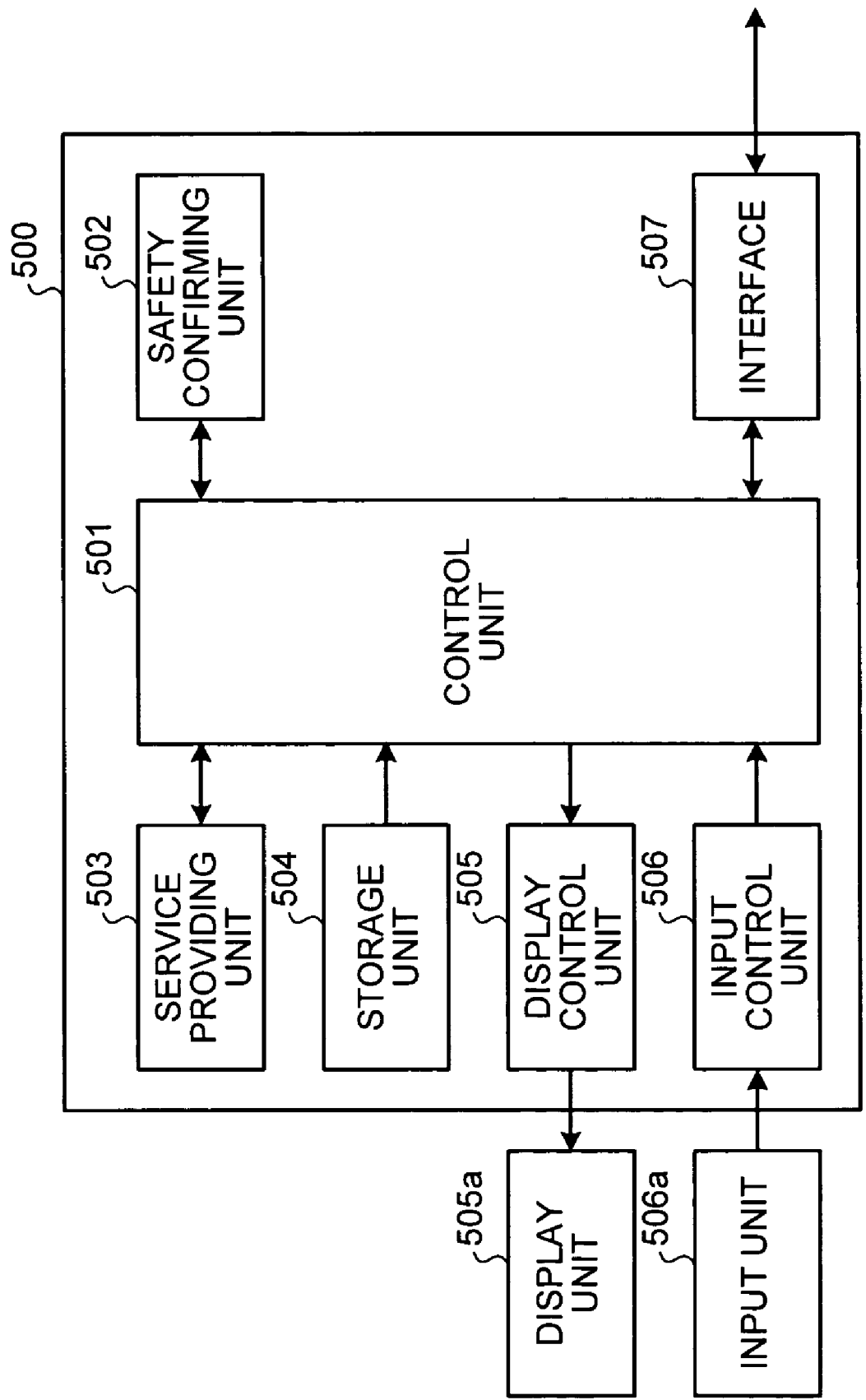
FIG. 3 is a functional block diagram of a structure of a service providing device shown in FIG. 1.

FIG. 3 is a functional block diagram of the structure of the service providing device 500 shown in FIG. 1. As shown in FIG. 3, the service providing device 500 includes a control unit 501 that controls the service providing device 500 as a whole, a safety confirming unit 502, a service providing unit 503 that carries out a process to provide a service, a storage unit 504 consisting of a volatile temporary storage unit that is a program work area and a non volatile magnetic disk device or a magneto optical disk device that is a program storage area, a display control unit 505 that controls display in a display unit 505a that is a display device, an input control unit 506 that receives an input operation from an input unit 506a such as a keyboard or a mouse, and an interface 507 for carrying out transfer of data with an external device by connecting the service providing device 500 with the network. The service providing unit 503 can also provide multiple services.

The safety confirming unit 502 carries out a process to transmit to the service use terminal 200, data of reliability of the service providing device 500 via the service mediating device 100. The data of reliability can be input by the service provider himself or herself who uses the service providing device 500 to provide a service. The data of reliability can also be rating data assigned by an external third organization. Performance indicators that can be physically fetched such as device performance of the service providing device 500 or communication performance of the connected wiring can also be automatically collected by the safety confirming unit 502.

Figure 4:
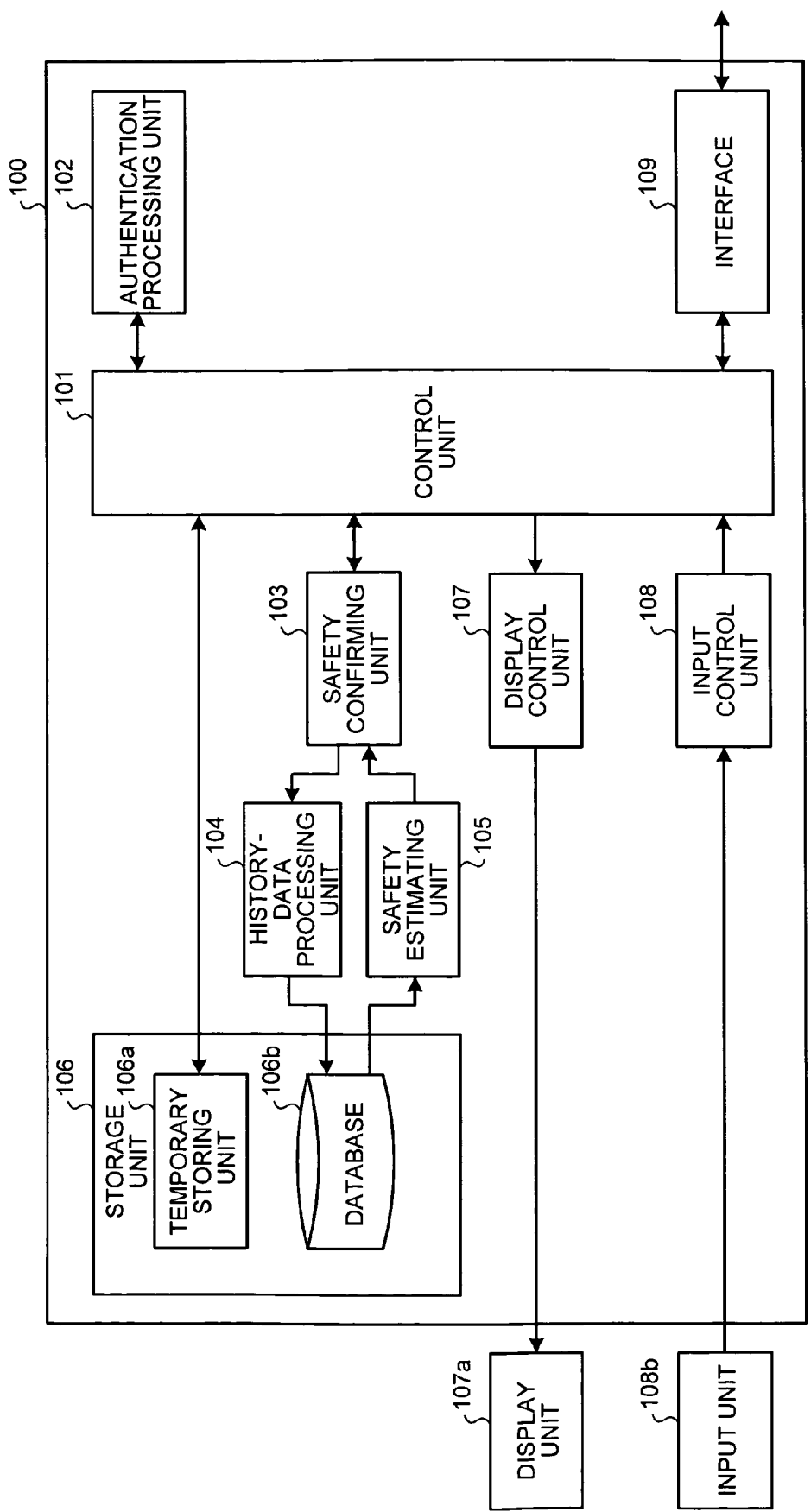
FIG. 4 is a functional block diagram of a structure of a service mediating device shown in FIG. 1.

FIG. 4 is a functional block diagram of the structure of the service mediating device 100 shown in FIG. 1. As shown in FIG. 4, the service mediating device 100 includes a control unit 101 that controls the service mediating device 100 as a whole, an authentication processing unit 102 that carries out an authentication process of the service use terminal 200 or the service providing device 500, a safety confirming unit 103, a history-data processing unit 104, a safety estimating unit 105, a storage unit 106 consisting of a volatile temporary storage unit 106a that is a program work area, a database 106b, and a non volatile magnetic disk device or a magneto optical disk device that is a program storage area, a display control unit 107 that controls display in a display unit 107a that is a display device, an input control unit 108 that receives an input operation from an input unit 108a such as a keyboard or a mouse, and an interface 109 for carrying out transfer of data with an external device by connecting the service mediating device 100 with the network.

The safety confirming unit 103 transmits to the service use terminal 200, data of reliability of the service providing device 500 that is transmitted from the service providing device 500. The safety confirming unit 103 also compares the data of reliability of the service providing device 500 with data of reliability requested for the service providing device 500 that is transmitted from the service use terminal 200 and determines whether reliability of the service providing device 500 satisfies reliability that is requested. Next, the safety confirming unit 103 carries out a process to distribute to the history-data processing unit 104 for storing in the database 106b, the data of reliability of the service providing device 500, data of reliability requested for the service providing device 500, and the aforementioned determination result. Further, if a service transfer between the service use terminal 200 and the service providing device 500 is authorized and if the service transfer is carried out, the safety confirming unit 103 distributes to the history-data processing unit 104 for storing in the database 106b, use data related to the service transfer (for example, connection start time, connection end time, connection time period, cumulative connection time period, cumulative connection frequency etc.).

Based on the data of reliability and the use data that are stored in the database 106b, the safety estimating unit 105 carries out a process to estimate reliability and use data in the future from an average during a fixed period in the past or a transition trend. The estimated data statistically indicates from a past connection status, a degree of safety and reliability of the service user and the service use terminal 200 or the service provider and the service providing device 500. The estimated data is transmitted to the service use terminal 200 if related to the service use terminal 200 and transmitted to the service providing device 500 if related to the service providing device 500 by the safety confirming unit 103, and displayed in the service use terminal 200 and the service providing device 500 respectively.

The database 106b includes a service-level-data table and a service-use-data table. Data that is stored in the service-level-data table and the service-use-data table is explained in detail later.

The service-level-data table that is included in the database 106b shown in FIG. 4 is explained next. FIG. 5 is a table image of the service-level-data table included in the database 106b shown in FIG. 4. A service level indicates a level of reliability, safety, and credibility of the service providing device 500 and the service provider. As shown in FIG. 5, the service-level-data table includes columns of "Recording date/time", "User ID", "Operating System (OS) data", "Firewall", "Communication method", "Access concentration", "Age", "Available time limit", "Available time", and "Available amount".

Data from the same service providing device 500 is recorded in a time sequence series in the service-level-data table. In other words, the service-level-data table may include records having the same "User ID" but different "Recording date/time" and other data. This is because "OS data", "Firewall", "Communication method", "Access concentration", "Age", "Available time limit", "Available time", and "Available amount" of the same service providing device 500 can change with the passage of time.

"Recording date/time" indicates a date/time when the record is recorded. "User ID" is a code that uniquely identifies a connection user of the service. Because the service mediating device 100 essentially treats the service providing device 500, the service provider, the service use terminal 200, and the service user as the same service connection users, the service use terminal 200 and the service user are also allocated the user ID similarly as the service providing device 500 and the service provider.

"OS data" includes data related to type, version, and update of the server OS of the service providing device 500. The OS data enables the service user to determine whether the server OS of the service providing device 500 is using OS products of high reliability, whether the server OS is using the latest version, and whether the server OS is always maintaining the latest version by putting a patch, thereby enabling to learn about the level of security awareness related to the server OS of the service provider who uses the service providing device 500.

"Firewall" is data that indicates whether the service providing device 500 is protected by a firewall. "Communication method" indicates a communication protocol that is used by the service providing device 500 when providing a service. "Access concentration" is data of whether accesses by service users of the service providing device 500 are concentrated or whether the service providing device 500 is receiving a mass access attack such as a Denial of Service (DoS) attack from an external device.

"Age" is data of target age of a user of the service provided by the service providing device 500. For example, if "Age" is "20 years and above", the service is available only to users of ages 20 years and above. If "Age" is "0 years and above", the service can be used by users of all ages.

"Available time limit" is data that indicates a limit of time period that is available to a single service user for continuously using the service. "Available time" is a time during which the service providing device 500 provides the service. For example, if "Available time" is "00 hours 00 minutes 00 seconds to 23 hours 59 minutes 59 seconds", the service is available during all times. However, if "Available time" is "04 hours 00 minutes 00 seconds to 23 hours 59 minutes 59 seconds", provision of the service is terminated during the time of "00 hours 00 minutes 00 seconds to 03 hours 59 minutes 59 seconds", and the service cannot be used.

"Available amount" is data that indicates an amount that is available to a single service user for a single time. For example, if "Available amount" is "100,000 yen", a single service user can use the service for up to 100,000 yen when using the service continuously for a single time.

"Credibility" is data of assigned credibility of the service providing device 500 and the service provider that is fetched from the external third organization. Data that is determined based on data of each item in the service-level-data table can also be used as data of credibility without fetching data of credibility from the external organization.

The service-level-data table can be used to store not only data related to safety and reliability that is explicitly indicated by the service providing device 500, but also data that cannot be aggregated during individual accesses such as access count that is a cumulative total of number of accesses to the service providing device 500, access time that is a cumulative total of time periods of accesses to the service providing device 500, response time between an access to the service providing device 500 and a response to the access etc. For example, popularity of the service can be learnt from the access count and the access time. Usability and amenity of the service can be learnt from the response time. The aforementioned data can also be included in reliability.

Data of whether the service providing device 500 is satisfying a service level requested by the service user can also be stored in the service-level-data table. Data of whether the service provision is authorized can also serve as an indication of reliability of the service providing device 500 and the service provider.

The service-use-data table included in the database 106b shown in FIG. 4 is explained next. FIG. 6 is a table image of the service-use-data table included in the database 106b shown in FIG. 4. As shown in FIG. 6, the service-use-data table includes columns of "Recording date/time", "User ID", "Connection partner ID", "Access start date/time", "Access end date/time", and "Access time".

Data from the same service providing device 500 or the service use terminal 200 is recorded in a time sequence series in the service-use-data table. In other words, because the service mediating device 100 essentially treats the service providing device 500, the service provider, the service use terminal 200, and the service user as the same service connection users, data of "Recording date/time", "User ID", "Connection partner ID", "Access start date/time", "Access end date/time", and "Access time" is recorded in the service-use-data table for each instance of service provision or service use.

If "User ID" is the service use terminal 200, "Access start time", "Access end time", and "Access time" during connection to the service providing device 500 identified by "Connection partner user ID" are recorded in the service-use-data table. Thus, the service use terminal 200 that makes an access, the service providing device 500 that is accessed, start time of the access (connection), end time of the access, and time period of the access are recorded in the service-use-data table. The aforementioned data enables to compile statistics of the service providing device 500 that is frequently accessed by the service use terminal 200.

If "User ID" is the service providing device 500, "Access start time", "Access end time", and "Access time" during connection from the service use terminal 200 that is identified by "Connection partner user ID" are recorded in the service-use-data table. Thus, the service providing device 500 that is accessed, the service use terminal 200 that makes the access, start time of the access (connection), end time of the access, and time period of the access are recorded in the service-use-data table. The aforementioned data enables to compile statistics of the frequency of access to the service providing device 500 or the service use terminal 200 that frequently accesses the service providing device 500.

"Recording date/time" is the date and the time when the record is recorded. "User ID" is a code that uniquely identifies a connection user of the service. "Connection partner user ID" is data that uniquely identifies a device that is connected to the device having the "User ID". If the device that is uniquely identified by "User ID" is the service use terminal 200, the device that is uniquely identified by the "Connection partner user ID" is the service providing device 500. If the device that is uniquely identified by "User ID" is the service providing device 500, the device that is uniquely identified by the "Connection partner user ID" is the service use terminal 200.

"Access start time" is the time when the service use terminal 200 identified by "User ID" starts access to the service providing device 500 that is identified by "Connection partner user ID", or the time when the service providing device 500 identified by "User ID" starts to be accessed by the service use terminal 200 that is identified by "Connection partner user ID".

"Access end time" is the time when the service use terminal 200 identified by "User ID" ends access to the service providing device 500 that is identified by "Connection partner user ID", or the time when the service providing device 500 identified by "User ID" ceases to be accessed by the service use terminal 200 that is identified by "Connection partner user ID".

"Access time" is a time period that is indicated by the difference between "Access start time" and "Access end time". "Access time" is data that is calculated by the safety confirming unit 103 or the history-data processing unit 104 and recorded in the service-use-data table after "Access start time" and "Access end time" are ascertained.

FIG. 7 is a flowchart of the sequence of the service-level confirming process executed in the reliability authorizing system shown in FIG. 1. First, the service mediating device 100 carries out a service starting process such as receiving a connection request from the service use terminal 200 (step S101). Next, the service mediating device 100 carries out a user authentication to authenticate the service use terminal 200 and the service user (step S102). If the user authentication is valid ("Yes" at step S103), the service mediating device 100 carries out a service authentication to authenticate the service providing device 500 and the service provider (step S104). If the user authentication is invalid ("No" at step S103), the service-level confirming process moves to step S115.

If the service authentication is valid ("Yes" at step S105), the service mediating device 100 fetches the latest service level of the service providing device 500 and stores the service level in the database 106b (step S106). If the service authentication at step S105 is invalid ("No" at step S105), the service-level confirming process moves to step S115.

The service mediating device 100 fetches from the service use terminal 200 the service level that is requested by the service user for the service providing device 500 and the service provider and stores the fetched service level in the database 106b (step S107). Next, the service mediating device 100 compares the service level of the service providing device 500 fetched at step S106 with the service level that is requested by the service user for the service providing device 500 and that is fetched at step S107, and determines whether the service level of the service providing device 500 satisfies the service level of the service providing device 500 that is requested by the service user (step S108).

If the service level of the service providing device 500 satisfies the service level of the service providing device 500 that is requested by the service user ("Yes" at step S109), the service mediating device 100 explicitly indicates the service level of the service providing device 500 and the service provider to the service user (step S110). Further, at step S110, based on the past service level or the service use data stored in the database 106b, the service mediating device 100 calculates an estimated value of the service level or the service use data in the future, and explicitly indicates the calculated value to the service user, thereby enabling the service mediating device 100 to provide the service user, statistical data of safety and reliability of the service provider based on the past history. The estimated value can be used to issue a warning to the service provider and to implement measures such as suspending the service provision if the service level is not upgraded even in the future, in other words, if a low estimated value of the service level is continuously calculated during a specified time period. If the service level of the service providing device 500 does not satisfy the service level of the service providing device 500 that is requested by the service user ("No" at step S109), the service-level confirming process moves to step S115.

According to an input of a determination result of whether the service is to be used by the service user, if the service is to be used ("Yes" at step S111), the service mediating device 100 starts service use (step S112), thereby starting provision of the service from the service providing device 500. If the service is not to be used ("No" at step S111), the service-level confirming process moves to step S115.

The service mediating device 100 determines whether to end the service use (step S113). If the service use is to be ended ("Yes" at step S113), the service-level confirming process moves to step S115, and if the service use is not to be ended ("No" at step S113), the service-level confirming process moves to step S114.

The service mediating device 100 determines whether the requested service level is still being satisfied (step S114). The aforementioned determining process enables to determine the service level of the service provider in real time. If the requested service level is still being satisfied ("Yes" at step S114), the service-level confirming process moves to step S113, and if the requested service level is no longer being satisfied ("No" at step S114), the service-level confirming process moves to step S115. The service level that is periodically updated and transmitted from the service providing device 500 is used as data to determine whether the service level is still being satisfied at step S114.

The service mediating device 100 stores the service use data (step S115). In other words, the service mediating device 100 records necessary data in the service-use-data table. Thus, recording the service use data records history related to service use. Next, the service mediating device 100 carries out a service ending process, and according to termination of service use by the service use terminal 200, disconnects the connection between the service use terminal 200 and the service providing device 500 (step S116).

In an example shown in a second embodiment of the present invention, service use is authorized according to whether reliability of the service user and the service use terminal satisfies the reliability requested by the service provider. In other words, according to the second embodiment, the service provider possesses discretion of authorizing service use. Differences in the network structures and functions related to the reliability authorizing method according to the first and the second embodiments are explained next. The network structure and the functions related to the reliability authorizing method according to the second embodiment other than the explained differences are the same as the network structure and the functions related to the reliability authorizing method according to the first embodiment.

Differences between the safety confirming unit 202 of the service use terminal 200, the safety confirming unit 502 of the service providing device 500, and the safety confirming unit 103 of the service mediating device 100 according to the first and the second embodiments are explained first.

The safety confirming unit 202 of the service use terminal 200 according to the second embodiment carries out a process to transmit data of reliability of the service use terminal 200 to the service providing device 500 via the service mediating device 100. The data of reliability can be input by the service user himself or herself who uses the service use terminal 200 to use a service. The data of reliability can also be rating data assigned by the external third organization. Further, performance indicators that can be physically fetched such as device performance of the service use terminal 200 or communication performance of the connected wiring can also be automatically fetched by the safety confirming unit 202.

The safety confirming unit 502 of the service providing device 500 according to the second embodiment receives the data of reliability of the service use terminal 200 that is transmitted from the service use terminal 200 via the service mediating device 100, and carries out a process causing the display control unit 505 of the service providing device 500 to display the received data in the display unit 505a. Based on the data of reliability of the service use terminal 200, the service provider can determine whether to select the service user when providing a service.

Further, the safety confirming unit 502 of the service providing device 500 according to the second embodiment carries out a process to notify to the service mediating device 100, data of reliability that is requested from a service user by the service provider and that is input from the input unit 506a via the GUI etc. that is displayed in the display unit 505a of the service providing device 500. The data of reliability that is requested from the service user serves as selecting conditions for the service provider for selecting a service user. The data of reliability includes not only physical safety data of the service use terminal 200 itself such as data of safety, but also data such as credibility of the service user who uses the service by using the service use terminal 200, limit of service availability amount etc. The data of reliability enables the service provider to receive service use of only the service user who satisfies desired reliability.

The safety confirming unit 103 transmits to the service providing device 500, data of reliability of the service use terminal 200 that is transmitted from the service use terminal 200. The safety confirming unit 103 also compares the data of reliability of the service use terminal 200 with data of reliability requested for the service use terminal 200 that is transmitted from the service providing device 500 and determines whether reliability of the service use terminal 200 satisfies reliability that is requested.

The safety confirming unit 103 carries out a process to distribute to the history-data processing unit 104 for storing in the database 106*b*, the data of reliability of the service use terminal 200, data of reliability requested for the service use terminal 200, and the aforementioned determination result. Further, if a service transfer between the service use terminal 200 and the service providing device 500 is authorized and if the service transfer is carried out, the safety confirming unit 103 distributes to the history-data processing unit 104 for storing in the database 106*b*, use data related to the service transfer (for example, connection start time, connection end time, connection time, cumulative connection time, cumulative connection frequency etc.).

According to the second embodiment, the user-level-data table is included in the database 106*b* instead of the service-level-data table in the first embodiment. FIG. 8 is a table image of the user-level-data table included in the database 106*b* shown in FIG. 4. A user level indicates a level of reliability, safety, and credibility of the service use terminal 200 and the service user. As shown in FIG. 8, the user-level-data table includes columns of "Recording date/time", "User ID", "Device type", "OS data", "Application data", "Virus inspection data", "Wiring type", "Peer-to-peer program", "Access concentration", "Age", "Available amount", "Payment delay", and "Credibility".

Data from the same service use terminal 200 is recorded in a time sequence series in the user-level-data table. In other words, the user-level-data table may include records having the same "User ID" but different "Recording date/time" and other data. This is because "Recording date/time", "User ID", "Device type", "OS data", "Application data", "Virus inspection data", "Wiring type", "Peer-to-peer program", "Access concentration", "Age" "Available amount", "Payment delay", and "Credibility" of the same service use terminal 200 can change with the passage of time.

"Recording date/time" indicates the date and the time when the record is recorded. "User ID" is a code that uniquely identifies a connection user of the service. Because the service mediating device 100 essentially treats the service providing device 500, the service provider, the service use terminal 200, and the service user as the same service connection users, the service providing device 500 and the service provider are also allocated the user ID similarly as the service use terminal 200 and the service user.

"Device data" is data of the type of the service use terminal 200 such as "Personal Computer (PC)", "Mobile phone", or "PDA". The device data enables to fetch statistics of the types of the service use terminal 200 that are connected to the service providing device 500.

"OS data" includes data related to type, version, and update of the OS of the service use terminal 200. The OS data enables the service provider to determine whether the OS of the service use terminal 200 is using OS products of high reliability, whether the OS is using the latest version, and whether the OS is always maintaining the latest version by putting a patch, thereby enabling to learn about the level of security awareness related to the OS of the service user who uses the service use terminal 200.

"Application data" includes data related to type, version, and update of application programs that are installed in the service use terminal 200. The application data especially includes data related to a browser that is used for service connection and dedicated connection application.

"Virus inspection data" includes data of whether virus check software is installed in the service use terminal 200 and is in operation, and version data of a virus definition file. The virus inspection data enables to learn about the level of security awareness of the service user of the service use terminal 200.

"Wiring type" indicates the type of wiring that is used by the service use terminal 200 for network connection and includes types such as "Asymmetric Digital Subscriber Line (ADSL)", "Wireless communication", or "Fiber To The Home (FTTH) (optical communication)". The wiring type enables to learn communication performance of the service use terminal 200.

"Peer-to-peer program" is data that indicates whether the service use terminal 200 is using a Peer to Peer communication application. "Access concentration" is data of whether the service use terminal 200 is receiving a mass access attack such as a DoS attack from an external device.

"Age" is age data of the service user of the service use terminal 200. "Age" is used to determine whether age conditions that the service providing device 500 seeks from the service user are satisfied.

"Available amount" is data that indicates an amount that is available to the service user for a single time. For example, if "Available amount" is "100,000 yen", a single service user can use the service for up to 100,000 yen when using the service continuously for a single time. The available amount can also be data that indicates a sum total of remaining available amounts of all the services for the service user.

"Payment delay" is credibility data related to credit and indicates whether the service user has a past history of payment delay. Although the aforementioned data of credibility is fetched from the external third organization, data based on the past history of the service mediating device 100 can also be used.

"Credibility" is data of assigned credibility of the service use terminal 200 and the service user that is fetched from the external third organization. Data that is determined based on data of each item in the user-level-data table can also be used as the data of credibility without fetching data of credibility from the external organization.

FIG. 9 is a flowchart of the sequence of the service-level confirming process according to the second embodiment executed in the reliability authorizing system shown in FIG. 1. First, the service mediating device 100 carries out a service starting process such as receiving a connection request from the service use terminal 200 (step S121). Next, the service mediating device 100 carries out a user authentication to authenticate the service use terminal 200 and the service user (step S122). If the user authentication is valid ("Yes" at step S123), the service mediating device 100 carries out a service authentication to authenticate the service providing device 500 and the service provider (step S124). If the user authentication is invalid ("No" at step S123), the service-level confirming process moves to step S135.

If the service authentication is valid ("Yes" at step S125), the service mediating device 100 fetches the latest user level of the service use terminal 200 and stores the user level in the database 106*b* (step S126). If the service authentication at step S125 is invalid ("No" at step S125), the service-level confirming process moves to step S135.

The service mediating device 100 fetches from the service providing device 500 the user level that is requested by the service provider from the service use terminal 200 and the service user and stores the fetched user level in the database 106*b* (step S127). Next, the service mediating device 100 compares the user level of the service use terminal 200 fetched at step S126 with the user level that is requested by the service provider from the service use terminal 200 and that is fetched at step S107, and determines whether the user level of the service use terminal 200 satisfies the user level of the service use terminal 200 that is requested by the service provider (step S128).

If the user level of the service use terminal 200 satisfies the user level of the service use terminal 200 that is requested by the service provider ("Yes" at step S129), the service mediating device 100 explicitly indicates the user level of the service use terminal 200 and the service user to the service provider (step S130). Further, at step S130, based on the past user level or the service use data stored in the database 106b, the service mediating device 100 calculates an estimated value of the user level or the service use data in the future, and explicitly indicates the calculated value to the service provider, thereby enabling the service mediating device 100 to provide the service provider, statistical data of safety and reliability of the service user based on the past history. The estimated value can be used to issue a warning to the service user and to implement measures such as suspending the service use if the user level is not upgraded even in the future, in other words, if a low estimated value of the user level is continuously calculated during a specified time period. If the user level of the service use terminal 200 does not satisfy the user level of the service use terminal 200 that is requested by the service provider ("No" at step S129), the service-level confirming process moves to step S135.

According to an input of a determination result of whether the service is to be provided by the service provider, if the service is to be provided ("Yes" at step S131), the service mediating device 100 starts service provision (step S132), thereby starting provision of the service from the service providing device 500. If the service is not to be provided ("No" at step S131), the service-level confirming process moves to step S135.

The service mediating device 100 determines whether to end the service provision (step S133). If the service provision is to be ended ("Yes" at step S133), the service-level confirming process moves to step S134, and if the service provision is not to be ended ("No" at step S133), the service-level confirming process moves to step S135.

Next, the service mediating device 100 determines whether the requested user level is still being satisfied (step S134). The aforementioned determining process enables to determine the user level of the service user in real time. If the requested user level is still being satisfied ("Yes" at step S134), the service-level confirming process moves to step S133, and if the requested user level is no longer being satisfied ("No" at step S134), the service-level confirming process moves to step S135. The user level that is periodically updated and transmitted from the service use terminal 200 is used as data to determine whether the user level is still being satisfied at step S134.

The service mediating device 100 stores the service use data (step S135). In other words, the service mediating device 100 records necessary data in the service-use-data table. Thus, recording the service use data records history related to service use. Next, the service mediating device 100 carries out a service ending process, and according to termination of the service provision by the service providing device 500, disconnects the connection between the service use terminal 200 and the service providing device 500 (step S136).

Although the present invention is described with reference to the first and the second embodiments, the invention in its broader aspects is not limited to the specific details and representative embodiments shown and described herein. Accordingly, various modifications may be made without departing from the spirit or scope of the general inventive concept as defined by the appended claims and their equivalents. Further, the first and the second embodiments can be executed simultaneously. In other words, service provision and service use can be enabled only if a service level requested by the service user from the service provider who is a connection partner and a user level requested by the service provider from the service user who is a connection partner are satisfied simultaneously. Further, the effects described in the first and the second embodiments are not to be thus limited.

According to an embodiment of the present invention, reliability of a connection partner can be learnt when using a service in a network, thereby enabling to use the reliability to determine whether to connect with the connection partner, thus enabling to exclude an unauthorized connection partner and enabling to secure safety of service transfer in the network.

Furthermore, according to an embodiment of the present invention, when using the service in the network, a requested level of reliability of a destination is provided and based on a comparison result of the requested level and actual reliability of the connection partner, whether to authorize service use is decided, thereby enabling a service user to select and use a service that includes desired credibility.

Moreover, according to an embodiment of the present invention, reliability of a partner device or a partner user is stored, thereby enabling to analyze or estimate reliability based on the stored data.

Furthermore, according to an embodiment of the present invention, an estimate of reliability of the partner device or the partner user can be provided, thereby enabling a user to select the partner user based on the estimate.

Moreover, according to an embodiment of the present invention, even when reliability of the connection partner satisfies requested conditions of reliability and a connection is authorized, reliability of the connection partner is reconfirmed even during a connected status, thereby enabling to select the connection partner based on reliability in real time.

Furthermore, according to an embodiment of the present invention, a service providing device can select a service user based on reliability of the service user.

Moreover, according to an embodiment of the present invention, a service use terminal can select a service provider based on reliability of the service provider.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A reliability authorizing method of determining whether to authorize a service transfer between a first device and a second device connected to a network based on first reliability of the first device or a user of the first device and second reliability of the second device or a user of the second device, the reliability authorizing method comprising:
   authenticating the first device and the second device;
   collecting the first reliability of the first device or the user of the first device and the second reliability of the second device or the user of the second device when the first and second devices are authenticated;
   obtaining a first requested level indicating reliability that is requested to the first device or the user of the first device by the user of the second device from the second device, and a second requested level indicating reliability that is requested to the second device or the user of the second device by the user of the first device from the first device;

storing the first reliability of the first device or the user of the first device collected and the second reliability of the second device or the user of the second device collected at the collecting;

performing a first future estimation of the first reliability based on the first reliability of the first device or the user of the first device stored at the storing, and performing a second future estimation of the second reliability based on the second reliability of the second device or the user of the second device stored at the storing;

determining whether the first future estimation of the first reliability of the first device or the user of the first device satisfies the first requested level obtained, and whether the second future estimation of the second reliability of the second device or the user of the second device satisfies the second requested level obtained; and starting the service transfer when the first and second requested level obtained is determined to be satisfied at the determining.

2. The reliability authorizing method according to claim 1, further comprising:

recollecting the first reliability of the first device or the user of the first device and the second reliability of the second device or the user of the second device;

redetermining whether the first reliability of the first device or the user of the first device recollected at the recollecting satisfies the first requested level obtained and whether the second reliability of the second device or the user of the second device recollected at the recollecting satisfies the second requested level obtained; and service-transfer-continuation authorizing, based on a result of redetermination at the redetermining, including
authorizing the service transfer when the first and second requested level obtained is satisfied; and
not authorizing the service transfer when the first or second requested level obtained is not satisfied.

3. The reliability authorizing method according to claim 1, wherein
the first device is a service use device that uses the service.

4. The reliability authorizing method according to claim 1, wherein
the first device is a service providing device that provides the service.

5. The reliability authorizing method according to claim 1, wherein
the first and second reliability includes
reliability data that is self-declared by the user of the first device;
performance data of the first device that is automatically collected; and
reliability data that is provided by a third organization.

6. The reliability authorizing method according to claim 1, further comprising:

providing the first reliability of the first device or the user of the first device collected at the collecting to the second device and the second reliability of the second device or the user of the second device collected at the collecting to the first device, when the first and second requested level obtained is determined to be satisfied at the determining; wherein the starting the service transfer includes starting the service transfer according to an input of a first determination result by a user of the first device and an input of a second determination result by a user of the second device, the first determination result based on the second reliability of the second device or the user of the second device provided to the first device at the providing and the second determination result based on the first reliability of the first device or the user of the first device provided to the second device at the providing.

7. A reliability authorizing device that determines whether to authorize a service transfer between a first device and a second device connected to a network based on first reliability of the first device or a user of the first device and second reliability of the second device or a user of the second device, the reliability authorizing device comprising:

a authentication unit that authenticates the first device and the second device;

a collecting unit that collects the first reliability of the first device or the user of the first device and the second reliability of the second device or the user of the second device when the first and second devices are authenticated by the authentication unit;

an obtaining unit that obtains a first requested level indicating reliability that is requested to the first device or the user of the first device by the user of the second device from the second device and a second requested level indicating reliability that is requested to the second device or the user of the second device by the user of the first device from the first device;

a partner-reliability storage unit that stores the first reliability of the first device or the user of the first device collected and the second reliability of the second device or the user of the second device collected by the safety confirming unit;

a future-reliability estimating unit that performs a first future estimation of the first reliability based on the first reliability of the first device or the user of the first device stored by the partner-reliability storage unit, and performs a second future estimation of the second reliability based on the second reliability of the second device or the user of the second device stored by the partner-reliability storage unit;

a safety confirming unit that determines whether the first future estimation of the first reliability of the first device or the user of the first device estimated by the future-reliability estimating unit satisfies the first requested level obtained and whether the second future estimation of the second reliability of the second device or the user of the second device estimated by the future-reliability estimating unit satisfies the second requested level obtained; and a controller that starts the service transfer when the first and second requested level obtained is satisfied.

8. The reliability authorizing device according to claim 7, further comprising:

a partner-reliability recollecting unit that recollects the first reliability of the first device or the user of the first device and the second reliability of the second device or the user of the second device;

a level-satisfaction redetermining unit that redetermines whether the first reliability of the first device or the user of the first device recollected by the partner-reliability recollecting unit satisfies the first requested level obtained and whether the second reliability of the second device or the user of the second device recollected by the partner-reliability recollecting unit satisfies the second requested level obtained; and a service-transfer-continuation authorizing unit that, based on a result of redetermination by the level-satisfaction redetermining unit, authorizes the service transfer when the first and second requested level obtained is satisfied, and does not authorize the service transfer when the first or second requested level obtained is not satisfied.

9. The reliability authorizing device according to claim 7, wherein
the first device is a service use device that uses the service.

10. The reliability authorizing device according to claim 7, wherein
the first device is a service providing device that provides the service.

11. The reliability authorizing device according to claim 7, wherein
the first and second reliability includes
reliability data that is self-declared by the user of the first device;
performance data of the first device that is automatically collected; and
reliability data that is provided by a third organization.

12. The reliability authorizing device according to claim 7, further comprising:
a partner-reliability providing unit that provides the first reliability of the first device or the user of the first device collected by the safety confirming unit to the second device and the second reliability of the second device or the user of the second device collected by the safety confirming unit to the first device, when the safety confirming unit determines that the first and second requested level obtained is satisfied; wherein
the controller starts the service transfer according to an input of a first determination result by a user of the first device and an input of a second determination result by a user of the second device, the first determination result based on the second reliability of the second device or the user of the second device provided to the first device by the partner-reliability providing unit and the second determination result based on the first reliability of the first device or the user of the first device provided to the second device by the partner-reliability providing unit.

13. A reliability authorizing system that determines whether to authorize a service transfer between a first device and a second device connected to a network based on first reliability of the first device or a user of the first device and second reliability of the second device or a user of the second device, the reliability authorizing system comprising:
a reliability authorizing device that includes
an authentication unit that authenticates the first device and the second device;
a collecting unit that collects the first reliability of the first device or the user of the first device and the second reliability of the second device or the user of the second device when the first and second devices are authenticated by the authentication unit;
an obtaining unit that obtains a first requested level indicating reliability that is requested to the first device or the user of the first device by the user of the second device from the second device and a second requested level indicating reliability that is requested to the second device or the user of the second device by the user of the first device from the first device;
a partner-reliability storage unit that stores the first reliability of the first device or the user of the first device collected and the second reliability of the second device or the user of the second device collected by the safety confirming unit;
a future-reliability estimating unit that performs a first future estimation of the first reliability based on the first reliability of the first device or the user of the first device stored by the partner-reliability storage unit, and performs a second future estimation of the second reliability based on the second reliability of the second device or the user of the second device stored by the partner-reliability storage unit;
a safety confirming unit that determines whether the first future estimation of the first reliability of the first device or the user of the first device estimated by the future-reliability estimating unit satisfies the first requested level obtained and whether the second future estimation of the second reliability of the second device or the user of the second device estimated by the future-reliability estimating unit satisfies the second requested level obtained; and
a controller that starts the service transfer when the first and second requested level obtained is satisfied.

14. The reliability authorizing system according to claim 13, wherein
the first device includes a first requested-level notifying unit that notifies the second requested level for the second reliability of the second device or the user of the second device, and the second device includes a second requested-level notifying unit that notifies the first requested level for the reliability of the first device or the user of the first device.

15. The reliability authorizing system according to claim 13, further comprising:
a partner-reliability providing unit that provides the first reliability of the first device or the user of the first device collected by the safety confirming unit to the second device and the second reliability of the second device or the user of the second device collected by the safety confirming unit to the first device, when the safety confirming unit determines that the first and second requested level obtained is satisfied; wherein
the controller starts the service transfer according to an input of a first determination result by a user of the first device and an input of a second determination result by a user of the second device, the first determination result based on the second reliability of the second device or the user of the second device provided to the first device by the partner-reliability providing unit and the second determination result based on the first reliability of the first device or the user of the first device provided to the second device by the partner-reliability providing unit.

* * * * *